United States Patent
Diamant et al.

(10) Patent No.: US 10,942,742 B1
(45) Date of Patent: Mar. 9, 2021

(54) HARDWARE ENGINE WITH CONFIGURABLE INSTRUCTIONS

(71) Applicant: Amazon Technologies, Inc., Seattle, WA (US)

(72) Inventors: Ron Diamant, Albany, CA (US); Sundeep Amirineni, Austin, TX (US); Mohammad El-Shabani, Seattle, WA (US); Sagar Sonar, Austin, TX (US); Kenneth Wayne Patton, Bee Cave, TX (US)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 16/216,212

(22) Filed: Dec. 11, 2018

(51) Int. Cl.
*G06F 9/30* (2018.01)
*G06F 9/38* (2018.01)
*G06N 20/00* (2019.01)

(52) U.S. Cl.
CPC ........ *G06F 9/3836* (2013.01); *G06F 9/30036* (2013.01); *G06F 9/30145* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,609,201 B1* | 8/2003 | Folmsbee | G06F 9/30145 712/E9.028 |
| 2005/0005157 A1* | 1/2005 | Folmsbee | G06F 21/71 726/3 |
| 2011/0238952 A1* | 9/2011 | Kai | G06F 9/30156 712/205 |
| 2015/0220344 A1* | 8/2015 | Siciliani | G06F 9/328 712/205 |
| 2019/0235458 A1* | 8/2019 | Buchanan | G11C 15/04 |

OTHER PUBLICATIONS

Francisco Barat, et al., Reconfigurable Instruction Set Processors: A Survey, 2000, IEEE, 6 pages.

* cited by examiner

*Primary Examiner* — Hyun Nam
(74) *Attorney, Agent, or Firm* — Kilpatrick Townsend & Stockton LLP

(57) ABSTRACT

A reconfigurable processing circuit and system are provided. The system allows a user to program machine-level instructions in order to reconfigure the way the circuit behaves, including by adding new operations. The system can include a profile access content-addressable memory (CAM) configured to receive an execution step value from a step counter. The execution step value can be incremented and/or reset by a step management logic. The profile access CAM can select an entry of a profile table based on an opcode and the execution step value, and the processing engine can execute microcode based on the selected entry of the profile table. The profile access CAM can translate the opcode to an internal short instruction identifier in order to select the entry of the profile table. The system can further include an instruction decoding module configured to merge multiple instruction fields into a single effective instruction field.

23 Claims, 7 Drawing Sheets

HARDWARE ENGINE WITH CONFIGURABLE INSTRUCTIONS

BACKGROUND

General-purpose computing hardware, such as Central Processing Units (CPUs), can be designed to provide a high degree of flexibility in the operations that the hardware can perform. In contrast, hardware acceleration engines can implement specific primitive operations faster and more efficiently than can general-purpose computing hardware, but, in turn may not be able to perform the range of operations that can be performed by general-purpose hardware. Conventionally, such acceleration engines may face a tradeoff between efficiency and flexibility, and can only provide efficiency boosts for primitive operations that are implemented at the time the hardware is designed. Hence, it would be desirable to combine the efficiency of a hardware acceleration engine with the flexibility to implement new instructions after the hardware is designed.

For example, Machine Learning (ML) is a rapidly changing field, with new primitives continually emerging. A conventional hardware acceleration engine for ML may provide boosted performance relative to a general-purpose processor, but may only implement primitives available at the time the hardware is designed. In a typical example, such a hardware acceleration engine could require a development period such as one year to eighteen months, during which time new operators may emerge in the ML field. Nevertheless, a conventional hardware acceleration engine's specification may remain fixed during the development period, posing a risk of designers choosing incorrect instructions at the start of a hardware project.

BRIEF DESCRIPTION OF THE DRAWINGS

Various embodiments in accordance with the present disclosure will be described with reference to the drawings, in which.

DETAILED DESCRIPTION

As mentioned above, hardware-implemented instructions, such as in hardware acceleration engines, can perform significantly faster and more efficiently than general-purpose computing hardware. For example, a vector processor or other acceleration engine can provide highly efficient parallel performance, particularly for application-specific computations, such as in Machine Learning (ML) and neural networks. Because ML and neural networks are rapidly changing fields, new primitives may continually emerge, yet a conventional hardware acceleration engine's specification may remain fixed during the development period.

The disclosed apparatus and methods implement a highly flexible vector accelerator or neural network processor, which can support user-defined instructions that can be modified even after the hardware is implemented and/or deployed. The vector processor may be capable of performing highly parallelized computations, such as array, vector, and/or ML primitive computations, such as pooling. Moreover, the disclosed apparatus and methods provide flexible, reconfigurable hardware, allowing developers or end-users to configure primitives and program (e.g., by writing software) machine-level microcode in the hardware engine in support of newly-developed instructions. For example, a hardware engine may be designed with a max pooling primitive that selects a mask from a 2×2 window of an image, and may be reconfigured to support min pooling, or to support max pooling with a new upper limit to the value generated. In an embodiment, the disclosed apparatus and methods can implement complex instruction set computer (CISC) instructions.

In the description herein, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
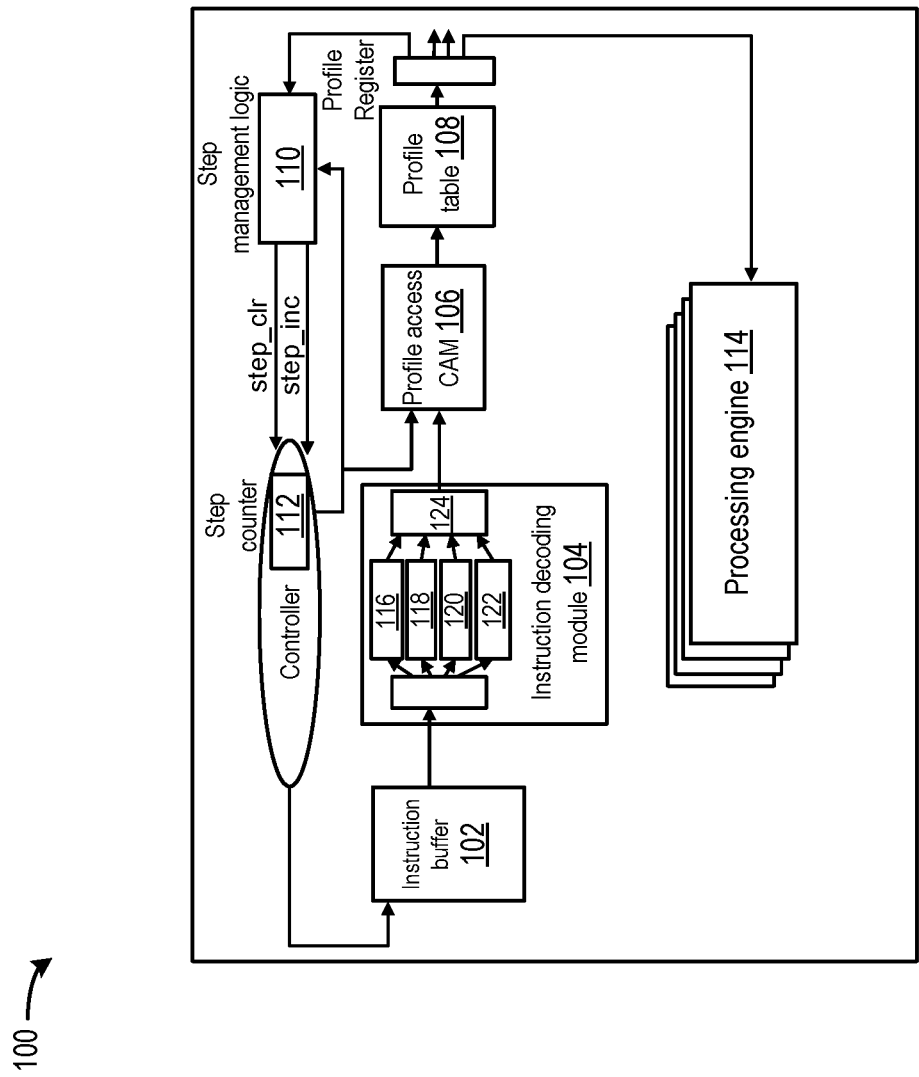
FIG. 1 is a circuit diagram illustrating an example reconfigurable integrated circuit, according to certain aspects of the disclosure.

FIG. 1 is a circuit diagram illustrating an example reconfigurable integrated circuit 100, according to certain aspects of the disclosure. For example, reconfigurable integrated circuit 100 could be a pooling engine. Reconfigurable integrated circuit 100 can contain many components, including instruction buffer 102, instruction decoding module 104, profile access content-addressable memory (CAM) 106, profile table 108, step management logic 110, step counter 112, and processing engine 114. Several of these components provide reconfigurable instruction processing, as described herein.

In an embodiment, instruction decoding module 104 reads instructions from instruction buffer 102. In an embodiment, instruction buffer 102 may hold a number of instruction fields, such as 256, each storing an amount of information, such as 64 bytes. Instruction decoding module 104 can merge together multiple instruction fields, such as fields 116-122, into a single field, such as field 124, as will be described below. For each input instruction field, instruction decoding module 104 can receive a bit input, and right-shift the input by a configurable offset, which may be specified as a number of bytes. In an embodiment, this offset is configurable by a Control and Status Register (CSR). Instruction decoding module 104 can then mask the result by a value with a configurable size, for example: (din>>[offset])& ~(11111 . . . 111<<[size]), where din is a respective input instruction field.

Next, instruction decoding module 104 can concatenate together the multiple different fields in the instructions read from memory into one effective field, representing the instruction. In an embodiment, instruction decoding module 104 can offset each instruction field by a configurable offset, then apply a logical OR operator to combine them. Accordingly, instruction decoding module 104 can concatenate the instruction fields in a flexible manner. In an embodiment, this allows the disclosed system and methods to define multiple fields so as to differentiate among related instructions.

In an embodiment, it is unnecessary for an engineer to know in advance, at design time, how many input instruction fields will be required to distinguish among related instructions. Rather than hard-coding this number, the disclosed system and methods can keep the number of input instruction fields flexible, thereby enabling changes to the set of supported instructions. The configurable offset and size can be chosen so the respective input instruction fields are uniquely non-overlapping, but as compact as possible, so as to generate the most compact representation of the instruction. For example, if an instruction is two bytes long, it can be represented by two input instruction fields having a configurable size of one byte, and with configurable offsets of zero and one byte, respectively. In an embodiment, the system uses a completely automated flow to set these configurations, for example the system can automatically determine the configurable offset and size based on code or programmed representations of the new instructions. In an embodiment, the instruction decode logic is programmable, and extracts multiple fields from the instruction according to a static programmed configuration.

Once the instruction fields have been extracted and/or merged, the system can use a lookup in profile access CAM 106 to translate a wide instruction identifier, such as an opcode or pooling type, to an internal short instruction identifier, also referred to as an instruction profile index. For example, the short instruction identifier may be listed and/or associated for lookup in the profile access CAM, indexed by the opcode or wide instruction identifier. In an example, the wide instruction identifier can include up to 32 bits of information, and the internal short instruction identifier 6 bits. In a typical embodiment, profile access CAM 106 may store a number of identifier pairs, such as 64, each holding an amount of information, such as 40 bits.

Such a translation layer can effectively mediate between software-visible instruction identifiers such as opcodes or pooling types, and hardware-visible instruction identifiers, such as the short instruction identifier or instruction profile index. Accordingly, this translation layer improves the re-configurability of the disclosed integrated circuit and methods, compared with conventional systems. For example, the disclosed system and methods can reassign a given opcode to a different, newly-designed, or modified primitive operation, or can reassign a given primitive operation to a new or different opcode. In another example, this conversion can provide backward compatibility, particularly by avoiding difficulties resulting from using non-contiguous opcode spaces when a first opcode space becomes filled. Thus, by using profile access CAM 106, the system can decouple the instruction identifier from control-path decisions, allowing users to add new instructions after the hardware is deployed, without being limited by opcode availability.

In yet another example, the system can implement reconfigurable multi-stage computations, such as finite state machines (FSMs), for example by tracking an execution step value (also referred to as a step number or stage number) via step management logic 110 and step counter 112, as disclosed herein. The instruction profile indices can then be associated by profile access CAM 106 with their respective combinations of wide instruction identifier (e.g., opcode) and step number.

Based on the extracted instruction identifier, e.g. the instruction profile index, reconfigurable integrated circuit 100 and/or profile access CAM 106 can select an entry in profile table 108 in order to generate microcode values that control the datapath. This may be similar to a datapath control process in a CPU. In a typical embodiment, profile table 108 can store a number of entries, such as 64, each holding an amount of information, such as 128 bytes. In an embodiment, user-programmed microcode can be stored in profile table 108. In an embodiment, a respective profile table entry can store one line of microcode, and can correspond to a respective profile access CAM entry. The microcode lines can then be executed by processing engine 114 during the computation.

In various embodiments, the disclosed integrated circuit, system, and methods can make use of microcode and/or control instructions, such as control signals or control words to control the execution of a processing engine, such as processing engine 114, a pooling engine, or a machine learning engine. In particular, the control signals can include signals such as an opcode determined by instruction decoding module 104 from one or more instruction fields, in order to control low-level operations of a central processing unit (CPU) or integrated circuit, such as reconfigurable integrated circuit 100. Microcode can be an interpreter layer translating assembled binary machine code into low-level instructions, which may be referred to as microinstructions. The microinstructions can be executable by hardware circuitry, such as reconfigurable integrated circuit 100. Microcode can implement similar functionality to control instructions, while further providing configurability and flexibility. In an embodiment, such control via microcode and/or control instructions can be implemented within a control unit and can be used to control a datapath. The control unit may be hardwired or microprogrammed, e.g., by microcode, and the datapath may comprise arithmetic logic units (ALUs), multipliers, and/or other components, and is not limited by the present disclosure. The terms control information, control signals, control words, and microcode may be used interchangeably herein.

In an embodiment where the system implements a reconfigurable multi-stage computation by tracking an execution step value, profile table 108 can include an entry for each stage of each computation. The entries, including microcode lines, can therefore be associated or indexed in profile table 108 by their respective internal instruction profile indices. These instruction profile indices, in turn, can be associated by profile access CAM 106 with their respective combinations of wide instruction identifier (e.g., opcode) and step number. Accordingly, the individual microcode lines can be associated by profile access CAM 106 and/or profile table 108 with the appropriate stages of the appropriate computations, and can be executed by processing engine 114 during the appropriate stages. In an embodiment, profile access CAM 106 and/or profile table 108 can receive the current step number from step counter 112, to be used while selecting the appropriate entry in profile table 108.

Reconfigurable integrated circuit 100 and/or profile table 108 can then transmit the microcode from the selected entry of profile table 108 to processing engine 114. For example, processing engine 114 could be a pooling engine, or another vector processor, acceleration engine, or neural network processor. Processing engine 114 can then execute the microcode received from profile table 108. Because processing engine 114 executes microcode from profile table 108 specific to an instruction identifier, such as an opcode, and/or a particular execution step value, the operations executed by processing engine 114 can be reconfigurable. Moreover, in the case of an FSM, the computations can be specific to both the opcode and stage, as disclosed herein.

As described above, in some embodiments the system can implement reconfigurable multi-stage computations, such as FSMs. In addition to sending the microcode to processing engine 114, reconfigurable integrated circuit 100 and/or profile table 108 can send microcode to step management logic 110, which is responsible for updating an execution step value in step counter 112. In an embodiment, the microcode can instruct step management logic 110 to update the execution step value when particular criteria are met (e.g., after reading a predefined number of inputs or performing a predefined number of iterations, or when a particular comparison among values is satisfied). Further, the microcode can also instruct step management logic of how to update the execution step value (e.g., by incrementing or resetting).

Once step counter 112 receives the updated execution step value, step counter 112 can, in turn, send the execution step value to profile access CAM 106, which can use the execution step value to translate a wide instruction identifier to an instruction profile index, and/or to select an entry in profile access CAM 108, as described above.

Figure 2:
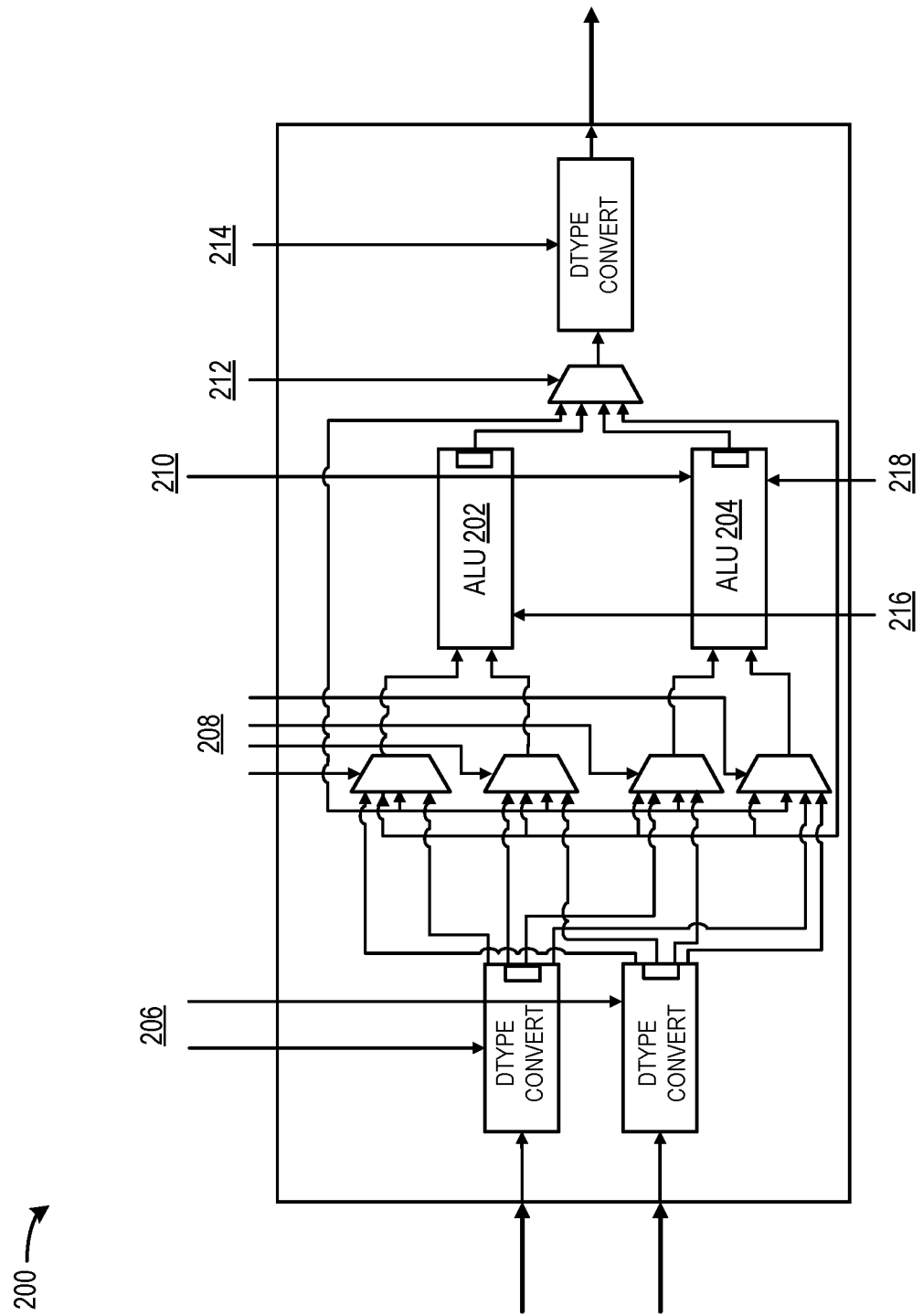
FIG. 2 is a circuit diagram illustrating an example reconfigurable processing engine, according to certain aspects of the disclosure.

FIG. 2 is a circuit diagram illustrating an example reconfigurable processing engine 200, according to certain aspects of the disclosure. Reconfigurable processing engine 200 can provide additional detail of processing engine 114 of the example of FIG. 1. For example, reconfigurable processing engine 200 could be a pooling engine.

In an embodiment, reconfigurable processing engine 200 provides a feedback loop, in which arithmetic logic units (ALUs), such as ALUs 202 and 204, can read the previous result in the subsequent cycle. Inputs 206-218 can be used to transmit control information or instructions from a profile table, like profile table 108 in the example of FIG. 1, to reconfigurable processing engine 200. In an embodiment, the transmitted control information can include microcode. In particular, values such as an instruction identifier can be transmitted from the profile table to the profile access CAM, e.g. profile access CAM 106 in the example of FIG. 1, and be used to select microcode. This microcode can then be transmitted via inputs 206-218 to reconfigurable processing engine 200, e.g. a pooling engine. Reconfigurable processing engine 200 and/or ALUs 202 and 204 can further receive additional inputs from a variety of sources in the integrated circuit, and are not limited by the present disclosure.

In an embodiment, reconfigurable processing engine 200 can only use instructions that have been implemented as primitives in the hardware. In an embodiment, reconfigurable processing engine 200 can use many operations that are a superset of the primitives.

Figure 3:
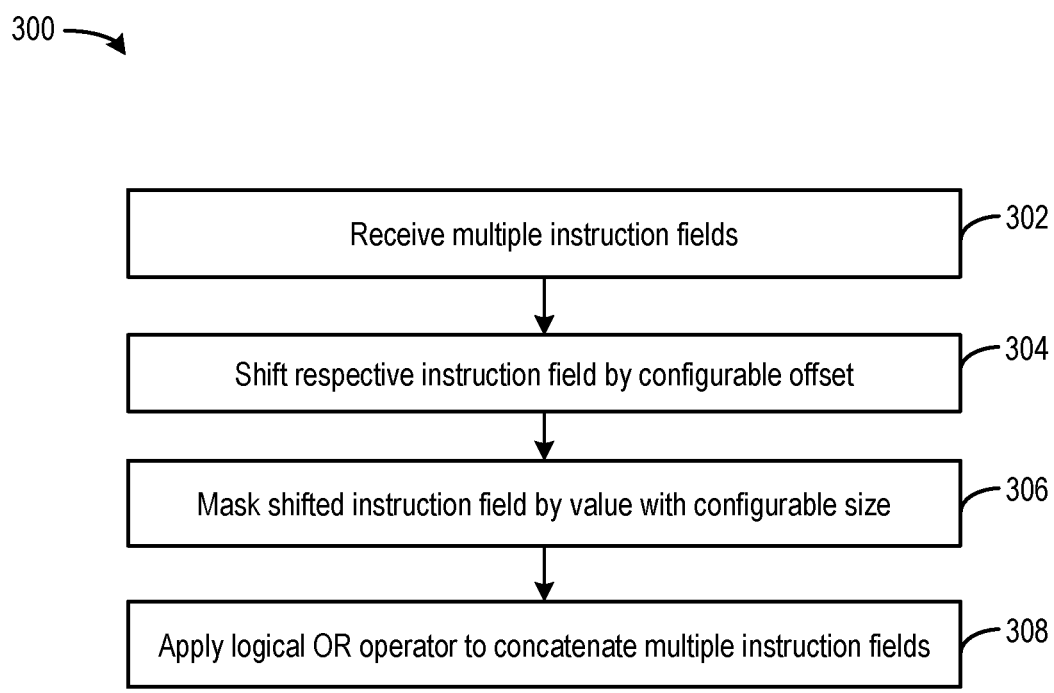
FIG. 3 includes a flowchart illustrating an example of a process for merging multiple instruction fields, according to certain aspects of the disclosure.
Figure 4:
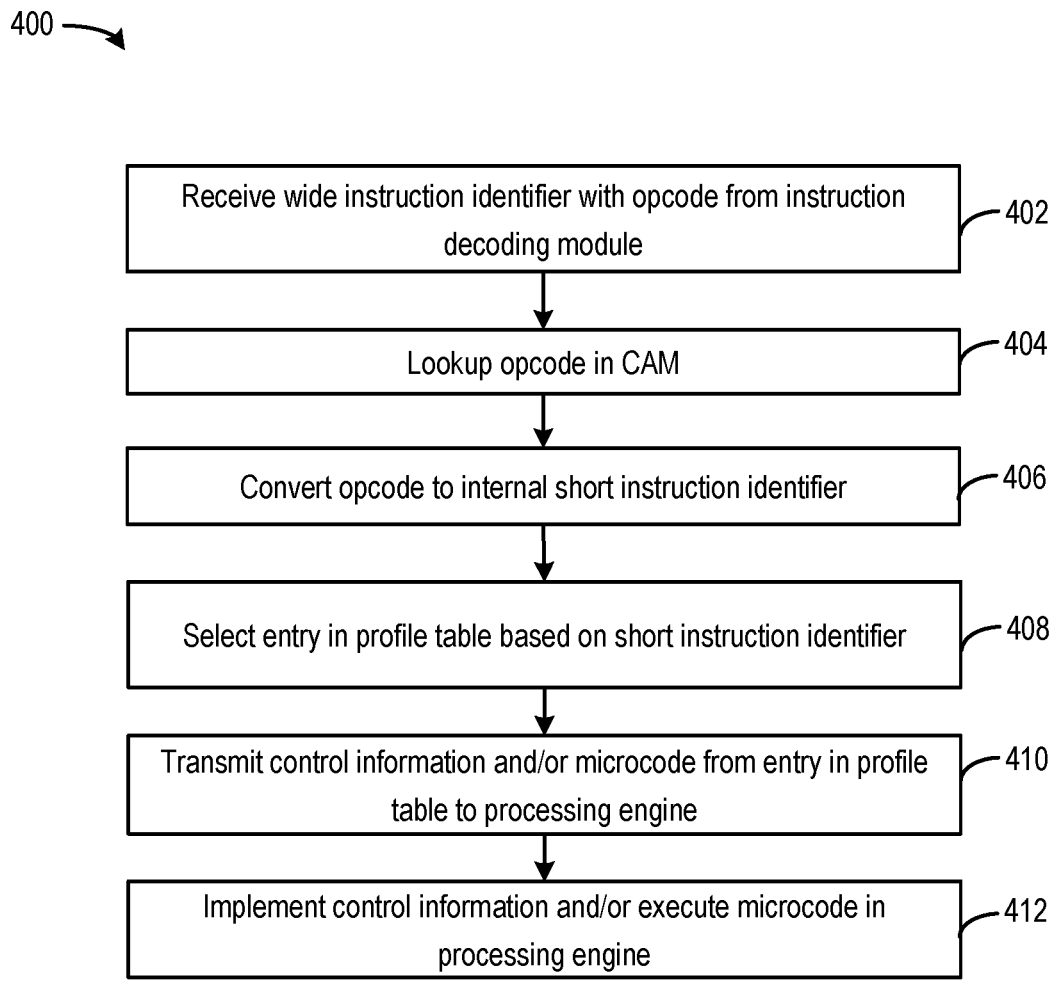
FIG. 4 includes a flowchart illustrating an example of a process for selecting an instruction to process, according to certain aspects of the disclosure.
Figure 5:
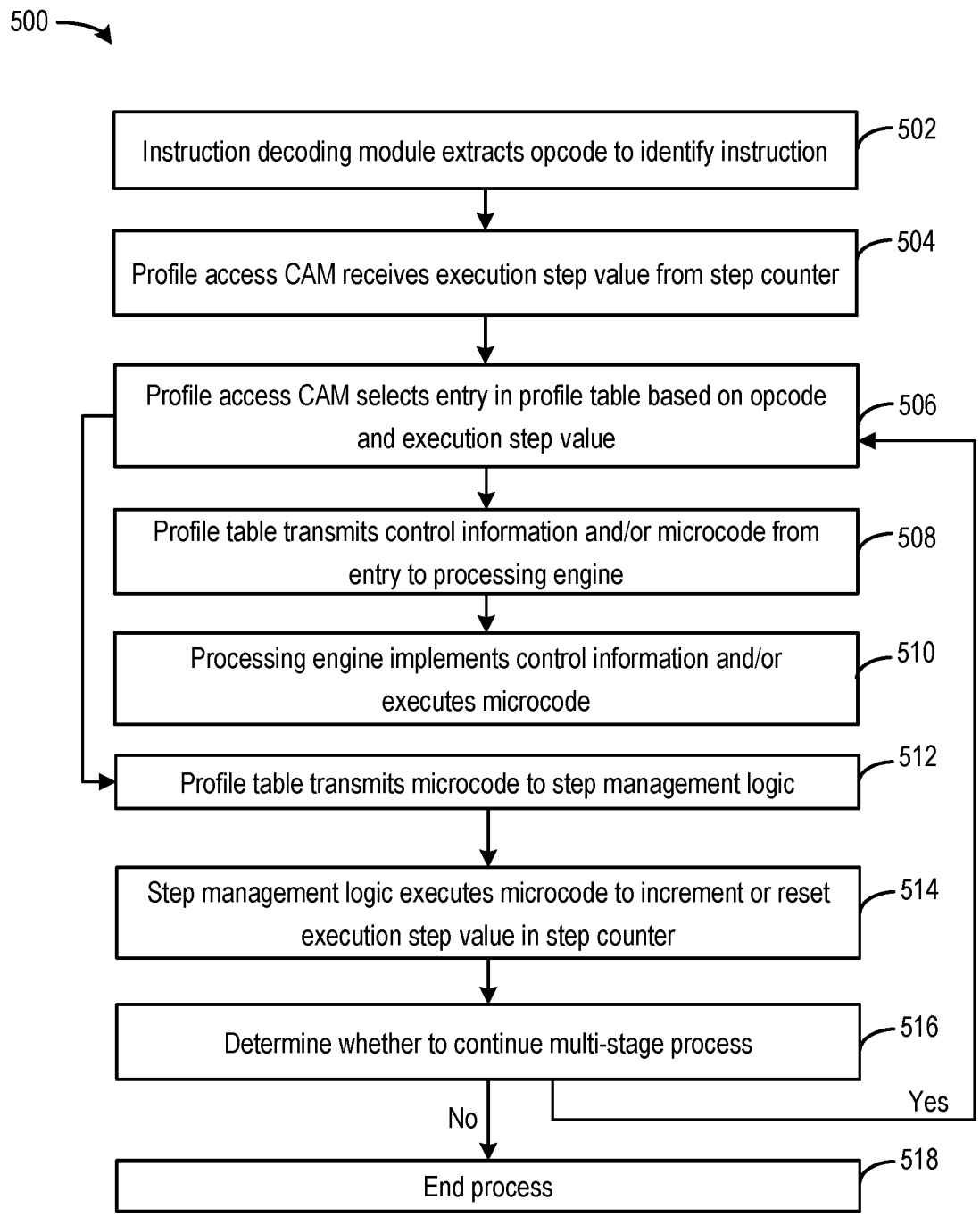
FIG. 5 includes a flowchart illustrating an example of a process for executing multi-stage instructions, according to certain aspects of the disclosure.

FIGS. 3-5 illustrate examples of methods for implementing reconfigurable hardware instructions. These methods may be implemented by the systems described above, such as for example the reconfigurable integrated circuit of the example of FIG. 1 and the reconfigurable processing engine of the example of FIG. 2.

FIG. 3 includes a flowchart illustrating an example of a process 300 for merging multiple instruction fields, according to certain aspects of the disclosure. In operation 302, the integrated circuit can receive multiple instruction fields. In operation 304, the integrated circuit can shift a respective instruction field by a configurable offset. In an embodiment, this offset is configurable by a Control and Status Register (CSR). Optionally, in operation 306, the integrated circuit can then mask the result by a value with a configurable size. In some embodiments, the integrated circuit does not mask the result, and is not limited by the present disclosure.

In operation 308, the integrated circuit can apply a logical OR operator to concatenate multiple instruction fields. The configurable offset and size can be chosen so the respective input instruction fields are uniquely non-overlapping, but as compact as possible, so as to generate the most compact representation of the instruction. Accordingly, defining multiple fields, and merging the multiple fields via process 300, can allow the disclosed system and methods to differentiate systematically and modularly among related instructions.

FIG. 4 includes a flowchart illustrating an example of a process for selecting an instruction to process, according to certain aspects of the disclosure. In operation 402, the integrated circuit and/or a profile access CAM can receive a wide instruction identifier, which can include an opcode, from an instruction decoding module. In operation 404, the integrated circuit and/or profile access CAM can perform a lookup for the received opcode in the profile access CAM. In operation 406, the integrated circuit can convert the opcode to an internal short instruction identifier based on the lookup in the profile access CAM. For example, the short instruction identifier may be listed, and/or associated, with the opcode or wide instruction identifier in the profile access CAM. In an example, the wide instruction identifier can include 32 bits of information, and the internal short instruction identifier 6 bits. In an embodiment, this conversion provides improved re-configurability or backward compatibility by avoiding using another opcode space, as described in the example of FIG. 1.

In operation 408, the integrated circuit can select an entry in the profile table based on the short instruction identifier. For example, the selected entry may be indexed by the short instruction identifier. The use of the profile access CAM can provide an indirection step, allowing the system to configure the location of the opcode and instruction identifiers, rather than requiring them to be hard-coded. In operation 410, the integrated circuit can obtain control information and/or microcode from the selected entry in the profile table and transmit the control information and/or microcode to a processing engine, such as a vector or acceleration engine or a pooling engine. In various embodiments, the system can use code, microcode, and/or control information, and is not limited by the present disclosure. Accordingly, the terms control information and microcode will be used interchangeably herein. In operation 412, the integrated circuit and/or the processing engine can implement the received control information and/or execute the received microcode.

In some embodiments, the disclosed apparatus and methods can implement a flexible multi-stage process and/or a finite state machine (FSM), such as a pooling computation on an array, e.g., a 3×3 window of inputs. This multi-stage instruction can be distinct from any primitives or operations supported by the hardware engine at design time, and instead can be designed after the hardware engine is implemented or deployed. In an embodiment, defining the number and/or content (such as the processing steps, inputs, and outputs) of stages in such a multi-stage process is one way the disclosed system may be reconfigured. Note that in some embodiments, the system can execute a single-stage process as a special case of the FSM disclosed herein, or can execute a single-stage process without the need to track a stage number or execution step value, and is not limited by the present disclosure.

The CAM instructions can progress through an internal multi-cycle process, wherein they switch between stages. For example, for a pooling operation in neural networks or ML, the system can read in a number of input elements, such as a 3×3 window. In an embodiment, the system can be configured to compute the minimum or maximum, respectively, by comparing each new input element to a current minimum or maximum value for the window. The first bypass may be important in order to restart each 3×3 pooling window. Conventionally, such operations would be hard-coded, for example in a two-state machine, a FSM is conventionally hard-coded to read the first input element in a first stage, then in a second stage, to compare the remaining eight elements. In an example, the disclosed system and methods could be used to implement a hybrid operation between max and average pooling, such as computing a maximum value for each input row, then averaging over three rows. With the disclosed system and methods, such a novel operation can be implemented without needing to modify the hardware.

Table 1 includes a flowchart illustrating an example of a process implementing multi-stage instructions, according to certain aspects of the disclosure. In this example, the disclosed apparatus and methods are utilized to implement a novel user-defined multi-stage instruction, called MINMAX_POOL_WEIRD(din_vector, M, N, dout_vector). In particular, the MINMAX_POOL_WEIRD instruction reads a vector of inputs (defined by a memory access pattern 'din_vector'), and accordingly can compute the minimum value of the first M elements, followed by the maximum value of the subsequent N elements, the minimum of the next M elements, etc. MINMAX_POOL_WEIRD can then output these values into a vector 'dout_vector.' For example, if the system first computes the minimum value for pooling of a 3×3 input window, then the number of inputs for the initial minimum computation is M=9. In another example, a call of MINMAX_POOL_WEIRD({5, 2, 9, 1, 8, 2, 7, 8, 4, 0, 2, 4, 9, 3}, 4, 3, dout_vector), would produce an output of dout_vector={1, 8, 0, 9}, where 1 is the minimum value of the first four elements, 8 is the maximum of the next three elements, and so forth. The procedure needed in order to implement this new instruction is disclosed herein. In an embodiment, changes to the hardware are unnecessary, as the disclosed apparatus and methods may be reconfigured so as to implement the user-defined multi-stage instruction set. In an embodiment, the user-defined multi-stage instruction can be implemented in the accelerator by configuring software.

TABLE 1

| Stage title: | first_min_element | non_first_min_element | first_max_element | non_first_max_element |
|---|---|---|---|---|
| Opcode: | 0x72 | 0x72 | 0x72 | 0x72 |
| Step: | 0 | 1 | 2 | 3 |
| ALU0-in_sel[0]: | FROM_MEMORY | FROM_MEMORY | FROM_MEMORY | FROM_MEMORY |
| ALU0-in_sel[1] | Not relevant | PREV_RESULT | Not relevant | PREV_RESULT |
| ALU0-opcode: | PASS_IN0 // pass first element, unchanged | MIN | PASS_IN0 // pass first element, unchanged | MAX |
| Condition to increment step: | Unconditionally increment | After (M-1) inputs | Unconditionally increment | Never |
| Condition to reset step to zero: | Never | Never | Never | After (N-1) inputs |
| Condition to write output: | Never write output | After (M-1) inputs | Never write output | After (N-1) inputs |

A user wishing to define a new hardware instruction, such as a multi-stage instruction, must first specify a new opcode for the instruction. Any value not previously occupied is valid. In this example, the new instruction is defined to have the opcode 0x72. Next, the instruction decode stage can proceed without changes to extract the opcode in order to identify the instruction.

The user must next program a CAM entry for each step of the computation. In this example, the user can define four CAM entries, as shown in Table 1: "first_min_element," "non_first_min_element," "first_max_element," and "non_first_max_element." These correspond to the four states or stages of the MINMAX_POOL_WEIRD computation. In this example, all four entries have the opcode 0x72, as described above. However, each entry corresponds to a different step identifier, numbered 0 through 3, respectively, as shown in Table 1.

Note that some of these stages can involve multiple data operations, such as inputs of multiple vector elements in stages 1 and 3, whereas other stages, such as stages 0 and 2, involve only one input during the stage. However, the stages themselves are not defined by having a fixed number of input elements, and so are not required to have equal numbers of inputs. Instead, the stages are well-defined, and the conditions for transitions among them precisely specified, by increment and reset conditions, as in the example of Table 1. Specifically, when the increment condition is satisfied, the system can advance to the next computational stage, and when the reset condition is satisfied, the system can repeat or restart the process from the first stage. In this example, stage 1 increments to stage 2 after (M−1) input elements, and stage 3 resets to stage 0 after (N−1) inputs, where M and N are variable lengths passed into MINMAX_POOL_WEIRD.

In the profile table, the user can program microcode lines, corresponding to the profile access CAM entries. In this example, the user programs four microcode lines, one for each state. The microcode lines can be associated by the profile access CAM and/or profile table with their respective combinations of opcode and step number, and can be executed by the processing engine during the respective stages.

In this example, the four stages together correspond to the MINMAX_POOL_WEIRD instruction that was described above. In particular, the first two stages correspond to outputting the minimum value of M elements of the input vector, and the last two stages correspond to outputting the maximum value of the subsequent N elements. Stages 0 and 2 correspond to the first element of the minimum and maximum computations, respectively; therefore, both of these two stages accept the first element of their respective input sequences, and immediately increment the execution step value. Stages 1 and 3 correspond to the remaining (M−1) and (N−1) elements of the minimum and maximum computations, respectively. Accordingly, these stages use ALU0-opcodes of MIN and MAX, respectively, and both stages read in the remaining elements before changing the execution step value. At the end of stage 3, the system can reset the execution step value to zero, and accordingly perform the minimum computation on the next M input elements.

FIG. 5 includes a flowchart illustrating an example of a process 500 for executing multi-stage instructions, such as the MINMAX_POOL_WEIRD instruction in the example of Table 1, according to certain aspects of the disclosure. In an embodiment, a primitive or instruction having only one stage can be implemented as a special case of process 500, or as a subset of the steps therein. In operation 502, the integrated circuit and/or an instruction decoding module can extract a wide instruction identifier, such as an opcode or pooling type, to identify an instruction. A single wide instruction identifier or opcode can refer to multiple stages of a multi-stage instruction, just as all the stages in the example of Table 1 share the opcode 0x72. In an embodiment, the system can further use a lookup in a profile access CAM to translate the wide instruction identifier, to an internal short instruction identifier, also referred to as an instruction profile index.

In operation 504, the integrated circuit and/or a profile access CAM receives an execution step value from a step counter. In some embodiments, the execution step value can be set in the step counter by a step management logic, such as step management logic 110 of the example of FIG. 1. In some embodiments, the step management logic, in turn, can be instructed by received microcode specific to the opcode and stage, as described in operations 512 and 514 below, and can update the execution step value as instructed by the received microcode. In an embodiment, multiple stages sharing an opcode are differentiated from each other by the execution step value, and thus are fully specified by the combination of opcode and execution step value. In operation 506, the integrated circuit and/or the profile access CAM selects an entry in a profile table based on the opcode and the execution step value. In some embodiments, the profile access CAM can also convert the opcode to a short instruction identifier, as in the example of FIG. 4, and can therefore select the entry in the profile table based on the short instruction identifier and/or the execution step value.

In operation 508, the integrated circuit and/or the profile table transmits control information and/or microcode from the entry in the profile table to a processing engine. In various embodiments, the system can use code, microcode, and/or control information, and is not limited by the present disclosure. Accordingly, the terms control information and microcode will be used interchangeably herein. As described with respect to operations 504 and 506, because the system can look up the control information and/or microcode in the profile table by a combination of opcode and execution step value, the microcode can be specific to the opcode and stage. Hence, the control information and/or microcode stored per entry of the profile table can implement multi-stage computations in a fully flexible way, i.e. such that the instructions carried out by the processor depend both on the overall computation being performed (via the opcode) and on the particular stage of the multi-stage computation. In particular, it is unnecessary to hard-code the FSM as hardware, and the FSM is entirely programmable. Because the instructions can be stored as microcode, the disclosed system and methods is capable of performing computations beyond ones originally designed at the time of hardware deployment. Moreover, in some embodiments, microcode can be changed or added after the hardware is deployed, so that new or modified computations are possible.

In operation 510, the integrated circuit and/or the processing engine implements the received control information and/or executes the received microcode. For example, in stages 1 and 3 of the MINMAX_POOL_WEIRD computation of Table 1, the processing engine can compute the minimum and maximum, respectively, of the received inputs. More specifically, in each iteration of stages 1 and 3, the microcode can instruct the processor to compare the next input element to the current minimum or maximum value, respectively, and replace the current value with the input element, if appropriate. After (M−1) or (N−1) of such iterations, respectively, stages 1 and 3 complete. Likewise, in stages 0 and 2, the microcode can instruct the processor to pass on the first input element unchanged, i.e. to set the current minimum or maximum value, respectively, equal to the first input element. In various embodiments, the microcode can also instruct the integrated circuit and/or processing engine to write output, to read from arithmetic logic units (ALUs), etc., as in the example of Table 1.

In operation 512, the profile table transmits microcode to a step management logic. In an embodiment, this microcode can instruct the step management logic to update the execution step value, e.g., by incrementing or resetting the execution step value in the step counter. In an embodiment, this microcode is specific to the opcode and current execution step value, so that each stage of the multi-stage computation can have its own criteria and behavior for updating the execution step value. In an embodiment, the microcode values can control the datapath, as in a CPU. In operation 514, the integrated circuit and/or the step management logic executes the microcode to increment or reset the execution step value in the step counter.

In an embodiment, the integrated circuit can repeat process 500, or some steps therein, multiple times as needed. The multi-stage process can also terminate. In operation 516, the integrated circuit determines whether to continue the multi-stage process. In various embodiments, the decision whether to continue process 500 can instead occur at a different point in operation 500, and is not limited by the present disclosure. For example, the decision can precede updating the execution step value in operation 512 and/or operation 514. There are several possible reasons the integrated circuit can decide to terminate process 500. Under normal operating circumstances, process 500 may terminate when all the received input data has been processed. For example, in the MINMAX_POOL_WEIRD computation of Table 1, the computation could terminate upon reading in all the elements of din_vector. In various embodiments, process 500 may also be terminated in response to cancellation (e.g., by a user), or an error. Process 500 may also be terminated in response to a combination of these conditions, or in response to another condition, and is not limited by the present disclosure. If the integrated circuit determines in operation 516 not to continue the multi-stage process (e.g., due to having completed processing the input data or having received a cancellation or error signal, exception, or event) process 500 can then end in operation 518.

If the integrated circuit determines in operation 516 to continue the multi-stage process, process 500 can then return to operation 502 and/or operation 504, to continue the multi-stage computation. In a typical example, process 500 would then proceed using the updated (i.e., incremented or reset) execution step value from operation 514. If the execution step value is incremented in operation 514, the multi-stage computation can proceed to the next stage.

If the execution step value is reset in operation 514, the multi-stage computation can return to an earlier stage, meaning, for example, that the multi-stage computation could repeat the instructions of stages previously performed, but with different data. Thus, in the example of Table 1, after initially computing the minimum value of the first M input elements and the maximum value of the subsequent N elements in stages 0 through 3, the integrated circuit can return to stage 0. The integrated circuit can then proceed to compute the minimum value of the next M input elements of the input vector, din_vector.

Figure 6:
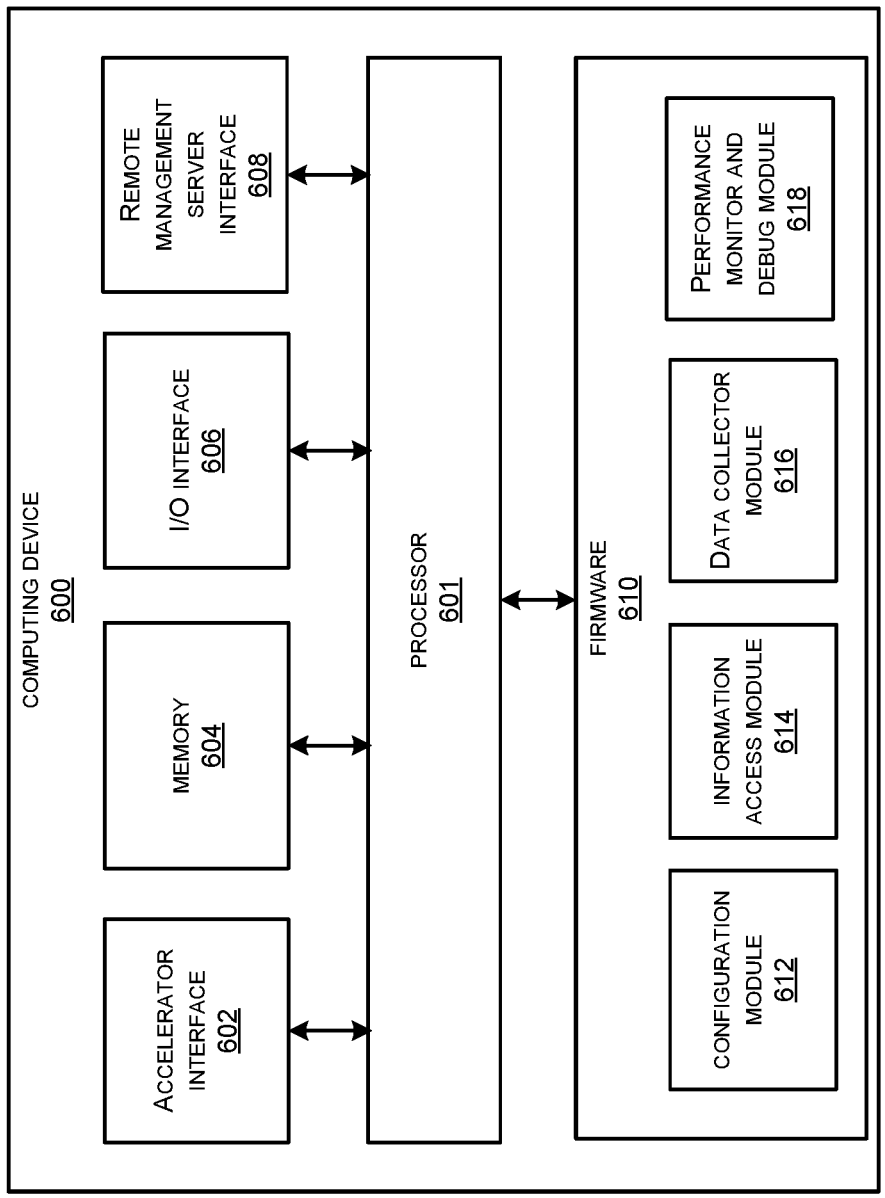
FIG. 6 illustrates an example of a computing device, according to certain aspects of the disclosure.

FIG. 6 illustrates an example block diagram for a computing device 600, according to certain embodiments. In an embodiment, computing device 600 can be part of a computing system configured to provide operational management of certain integrated circuits in the computing system. The computing system may be part of a server configured to provide cloud computing services to various clients. The computing system can include a host processor, such as a general purpose processor for executing program instructions, which can also be referred to as the computing system's primary processor, and/or as a Central Processing Unit (CPU). A memory may be accessible by the host processor and the accelerator device(s). The computing system may include a plurality of accelerator devices coupled to the host processor. The accelerator device may be designed to perform certain functions, such as floating point calculations or graphics rendering, more efficiently and can be configured to offload these operations from the host processor. Each accelerator device may include an accelerator engine and a computing device 600. The computing device may be coupled to a network via a network controller. A remote management server may be configured to provide fleet management services for the cloud.

The computing device 600 may include a processor 601 configured to execute firmware 610 to perform operational management and debug of the accelerator engine. The processor 601 may be coupled to an accelerator interface 602, a memory 604, an I/O interface 606, and a remote management server interface 608.

The processor 601 may include one or more processor cores configured to execution instructions. For example, the instructions may be in the form of firmware 610. The firmware 610 may be stored in a RAM, ROM, flash memory, EEPROM, or any suitable memory configured to store instructions that can be executed by the processor 601. The firmware 610 may include a configuration module 612, an information access module 614, a data collector module 616, and a debug module 618.

The accelerator interface 602 may be configured to allow communication between the computing device 600 and the acceleration engine. In some implementations, the accelerator interface 602 may be based on a synchronous serial interface protocol, e.g., the serial peripheral interface (SPI).

The memory 604 may include a RAM or another type of volatile memory. In some implementations, the memory 604 may be an independent device or part of another memory. The memory 604 may include one or more queues to store one or more types of notification messages. For example, the memory 604 may include an error notification queue to store error notification messages and an event notification queue to store event notification messages. In some embodiments, the error notification queue and the event notification queue may be configured by writing to corresponding configuration registers in the system configuration registers. For example, writing to the corresponding configuration registers may include configuring a base address, size, pointers, etc. for each queue.

The I/O interface 606 may include one or more interfaces to one or more I/O devices. In some implementations, the I/O interface 606 may include an interrupt interface to receive interrupts from various I/O devices on the PCIe card, e.g., voltage sensors, clock controllers, temperature sensors, etc. In some implementations, the I/O interface 606 may be used to receive interrupts when there is a change in the physical parameters of the PCIe card (e.g., temperature, humidity, airflow, etc.), which may be used by the computing device 600 to monitor physical health of the PCIe card.

The remote management server interface 608 may be configured to communicate with a remote management server via a network. For example, the remote management server interface 608 may be used to communicate with the network controller over the Ethernet. In some embodiments, the remote management server interface 608 may be based on an API based protocol, for example, constrained application protocol (CoAP), or REST, to communicate with the remote management server over the Ethernet. The remote management server may execute fleet management software to configure and manage the accelerator engine.

The configuration module 612 may be used to configure the integrated circuit. For example, the configuration module 612 may be used to write the system configuration registers to configure the notification queues, or to enable the generation of notification messages. The configuration module 612 may also be used to initialize different components of the accelerator engine, e.g., data movement processors, accelerators, memory controllers, by writing to associated registers. In some examples, the configuration module 612 may run some test runs on the PCIe card after initialization to test the default configuration. Once the PCIe card is initialized and tested, the driver executing on the host processor can configure the user registers to start running workloads on the accelerators.

The information access module 614 may be configured to access the information associated with a notification message received by the computing device 600 in the memory 604. In some implementations, the information access module 614 may access the phase value to determine if a new notification message is received. For example, initially, before any notifications are received, each entry in the error notification queue and the event notification queue may be zero. In this example, when the integrated circuit starts to send notification messages, the integrated circuit can set the phase value in each notification message to one. The information access module 614 may then periodically check the queue entry pointed to by a head pointer to see if the phase value has been changed from zero to one, and when the phase value changes to one, it may be an indication of a new notification message as pointed by the head pointer. The information access module 614 may then access the information associated with the notification message. For example, the information access module 614 may access the timestamp, the notification type, and the metadata associated with the notification type from the notification message. The information access module 614 may also be used to read the system CSRs and the system statistics registers based on the notification type and the metadata. For example, if the notification type indicates an error notification message, the information access module 614 may read the current execution state register in the system CSRs or the current timestamp register. Furthermore, depending on the error identifier in the metadata, the information access module 614 may read a related register in the system statistics registers. In some examples, the information access module 614 may read the relevant registers to collect data related to the notification message for debugging purpose or for monitoring the performance.

The data collector module 616 may be configured to collect data based on the information associated with each notification message received over a period of time. For example, the data collector module 616 may collect data read by the information access module 614 based on the notification type and the metadata in each notification message received over a period of time. In some example, the collected data may be sent to the remote management server via the remote management server interface 608 for analysis. The remote management server interface 608 may use the collected data to create a timeline using the timestamps in the notification messages received over a period of time. The remote management server may determine based on the timeline if a particular accelerator needs to be shut down or the workload needs to be redistributed among the accelerators. In some examples, the remote management server may provide new configuration values via the remote management server interface 608, which can be used by the configuration module 612 to reconfigure one or more data movement processor or the accelerators. In some examples, the collected data may be used by the performance monitor and debug module 618.

In some examples, the performance monitor and debug module 618 may use the collected data for debugging or performance monitoring. For example, the performance monitor and debug module 618 may create a timeline using the timestamps in the notification messages received over a period of time. The performance monitor and debug module 618 may determine if a certain performance threshold is met based on the timeline. The performance monitor and debug module 618 may provide new configuration values to the configuration module 612 if the performance threshold is not met. In some example, performance monitor and debug module 618 may provide new configuration values to the configuration module 612 to test a particular accelerator or the data movement processor while other accelerators and the data movement processors are executing.

Figure 7:
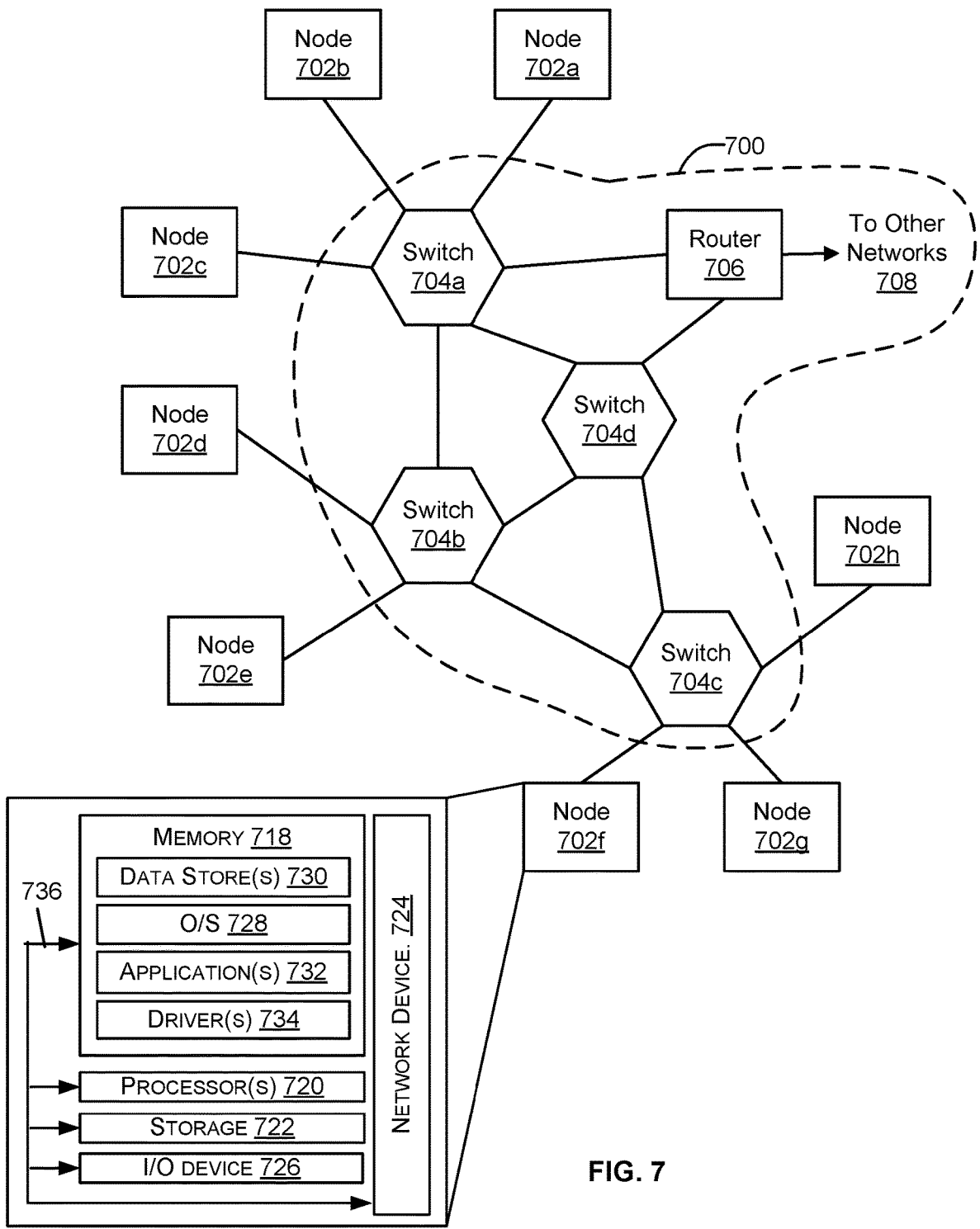
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704a-704d may be connected to a plurality of nodes 702a-702h and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702a-702h may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702a-702h, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702a-702h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702a-702h or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 724 that allow the node(s) 702a-702h to communicate with a stored database, another computing device or server, user terminals and/or other devices on the network(s) 700. The network device(s) 724 of FIG. 7 may include similar components discussed with reference to the network device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A reconfigurable integrated circuit, comprising:
    an instruction buffer configured to store instructions;
    a processing engine;
    a step counter and step management logic, wherein:
        the step counter and step management logic together with programming implement a configurable finite state machine (FSM) for the reconfigurable integrated circuit; and
        the step management logic is configured to update an execution step value and send the updated execution step value to the step counter;
    a programmable instruction decoding module configured to:
        receive an instruction from the instruction buffer based on an output of the step counter; and
        translate a plurality of instruction fields of the instruction to an identifier;
    a profile table that includes a plurality of entries, wherein each entry includes information for directing execution of the processing engine;
    a profile access content-addressable memory (CAM) configured to:
        receive, as a first input, the execution step value from the step counter;
        receive, as a second input, the identifier from the programmable instruction decoding module; and
        select an entry of the profile table based on the first input and the second input;
    wherein the processing engine is configured to execute the instruction based on information included in the selected entry of the profile table; and
    wherein the step management logic is configured to update the execution step value based on the information included in the selected entry of the profile table, instruction identifier from the output of the instruction decoding module to an internal short instruction identifier.

2. The reconfigurable integrated circuit of claim 1, wherein updating the execution step value comprises incrementing the execution step value or resetting the execution step value.

3. The reconfigurable integrated circuit of claim 1, wherein the processing engine comprises a vector processor or an inferential machine learning (ML) engine.

4. An integrated circuit, comprising:
    an instruction buffer configured to store instructions;
    an instruction decoding module configured to receive a first instruction from the instruction buffer and generate an output based on decoding the first instruction;
    a profile table comprising a plurality of entries, wherein each entry comprises control information;
    a profile access content-addressable memory (CAM) configured to:
        receive, as a first input, the output of the instruction decoding module;
        receive, as a second input, an indication of a computational stage of a configurable finite state machine (FSM) implemented by the integrated circuit; and
        select an entry from the plurality of entries of the profile table based on the first input and the second input; and
    a processing engine configured to execute operations based on the control information from the selected entry of the profile table, the operations implementing the computational stage of the configurable FSM,
    wherein the instruction decoding module is configured to receive a second instruction from the instruction buffer based on the control information from the selected entry of the profile table.

5. The integrated circuit of claim 4, wherein, while selecting the entry of the profile table, the profile access CAM is further configured to translate a wide instruction identifier from the output of the instruction decoding module to an internal short instruction identifier.

6. The integrated circuit of claim 4, further comprising:
    a step counter configured to send an execution step value to the profile access CAM, wherein the execution step value denotes the computational stage of the configurable FSM, and wherein, while selecting the entry of the profile table based on the computational stage, the profile access CAM is further configured to select the entry of the profile table based on the execution step value;

a step management logic configured to update the execution step value and send the updated execution step value to the step counter; and wherein the instruction decoding module is configured to receive the first instruction and the second instruction from the instruction buffer based on outputs of the step counter.

7. The integrated circuit of claim 6, wherein updating the execution step value comprises incrementing the execution step value or resetting the execution step value.

8. The integrated circuit of claim 6, wherein the profile table stores microcode instructing the step management logic to update the execution step value.

9. The integrated circuit of claim 4, wherein the instruction decoding module is configured to merge multiple instruction fields into a single effective instruction field.

10. The integrated circuit of claim 9, wherein merging the multiple instruction fields comprises applying a logical OR operator or concatenating the multiple instruction fields.

11. The integrated circuit of claim 10, wherein applying the logical OR operator further comprises shifting a respective instruction field by an offset, the offset configurable by a Control and Status Register (CSR).

12. The integrated circuit of claim 4, wherein the processing engine comprises a vector processor or an inferential machine learning (ML) engine.

13. The integrated circuit of claim 4, wherein the instruction decoding module includes programmable logic circuit to output an opcode based on extracting one or more fields from an instruction; and wherein at least one of the opcode or the one or more fields are programmable.

14. The integrated circuit of claim 4, wherein:
the control information comprises microcode;
the processing engine receives the microcode from the selected entry of the profile table; and
while executing the operations based on the control information, the processing engine executes at least the received microcode.

15. A method, comprising:
counting, by a step counter, an execution step value denoting a computational stage of a configurable finite state machine (FSM);
receiving, by an instruction decoding module and based on an output of the step counter, an instruction from an instruction buffer;
decoding, by the instruction decoding module, one or more instruction fields of the instruction into an instruction identifier;
receiving, by a profile access content-addressable memory (CAM), the execution step value from the step counter;

selecting, by the profile access CAM, an entry in a profile table, the entry containing control information, and the selecting based on:
the execution step value denoting the computational stage; and
the instruction identifier;
executing, by a processing engine, operations based on the control information, wherein the operations implement the computational stage of the configurable FSM; and
updating the execution step value based on the control information.

16. The method of claim 15:
wherein the instruction identifier is a wide instruction identifier; and
further comprising translating, by the profile access CAM, the wide instruction identifier to an internal short instruction identifier.

17. The method of claim 15, further comprising:
updating, by a step management logic, the execution step value; and
sending, by the step management logic, the updated execution step value to the step counter.

18. The method of claim 17, wherein updating the execution step value comprises incrementing the execution step value or resetting the execution step value.

19. The method of claim 15, further comprising merging, by the instruction decoding module, multiple instruction fields into a single effective instruction field.

20. The method of claim 15, wherein the control information comprises microcode, and wherein executing the operations based on the control information further comprises:
receiving, by the processing engine, the microcode from the selected entry of the profile table; and
executing at least the received microcode.

21. The integrated circuit of claim 13, wherein the profile access CAM is configured to store a mapping among the opcode, the indication of the computational stage, and one or more entries of the profile table, the mapping being changeable; and wherein the profile access CAM is configured to select the entry based on the mapping.

22. The integrated circuit of claim 21, wherein each entry of the one or more entries of the profile table stores an indication of a next computation stage; and wherein the second input is generated based on the indication of the next computation stage stored in the selected entry.

23. The integrated circuit of claim 4, wherein the control information stored in the profile table is changeable.

* * * * *

UNITED STATES PATENT AND TRADEMARK OFFICE
CERTIFICATE OF CORRECTION

PATENT NO. : 10,942,742 B1
APPLICATION NO. : 16/216212
DATED : March 9, 2021
INVENTOR(S) : Ron Diamant et al.

Page 1 of 1

It is certified that error appears in the above-identified patent and that said Letters Patent is hereby corrected as shown below:

In the Claims

Column 20, Lines 19-21, Claim 1:
Delete: ", instruction identifier from the output of the instruction decoding module to an internal short instruction identifier."
Insert: -- . --

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*